United States Patent
Li et al.

(10) Patent No.: US 9,158,118 B2
(45) Date of Patent: Oct. 13, 2015

(54) DEVICE FOR SPLITTING LIGHT INTO COMPONENTS HAVING DIFFERENT WAVELENGTH RANGES AND METHODS OF USE

(71) Applicant: ACEA BIOSCIENCES, INC, San Diego, CA (US)

(72) Inventors: Nan Li, San Diego, CA (US); Ye Chen, Hangzhou (CN); Xiaobo Wang, San Diego, CA (US)

(73) Assignee: ACEA Biosciences, Inc., San Diego, CA (US)

( * ) Notice: Subject to any disclaimer, the term of this patent is extended or adjusted under 35 U.S.C. 154(b) by 147 days.

(21) Appl. No.: 13/656,457

(22) Filed: Oct. 19, 2012

(65) Prior Publication Data

US 2013/0100443 A1    Apr. 25, 2013

Related U.S. Application Data

(60) Provisional application No. 61/549,379, filed on Oct. 20, 2011.

(51) Int. Cl.

| | |
|---|---|
| *G02B 27/10* | (2006.01) |
| *G01J 3/443* | (2006.01) |
| *G02B 5/04* | (2006.01) |
| *G02B 27/14* | (2006.01) |
| *G01J 3/14* | (2006.01) |
| *G01J 3/36* | (2006.01) |
| *G02B 5/28* | (2006.01) |

(52) U.S. Cl.
CPC .............. *G02B 27/1006* (2013.01); *G01J 3/14* (2013.01); *G01J 3/36* (2013.01); *G01J 3/443* (2013.01); *G02B 5/04* (2013.01); *G02B 27/141* (2013.01); *G02B 27/142* (2013.01); *G02B 5/285* (2013.01)

(58) Field of Classification Search
CPC ............ G01N 21/645; G01N 21/6428; G01N 2/6452; G01N 2021/642; G01N 2021/6484
USPC .................................................. 356/417–419
See application file for complete search history.

(56) References Cited

U.S. PATENT DOCUMENTS

| | | | |
|---|---|---|---|
| 4,482,994 A | * | 11/1984 | Ishikawa .......................... 398/86 |
| 4,707,064 A |   | 11/1987 | Dobrowolski et al. |
| 5,865,520 A | * | 2/1999 | Kavanagh et al. ............... 353/31 |
| 5,930,048 A |   | 7/1999 | Kaneko |
| 6,558,945 B1 |   | 5/2003 | Kao |
| 2009/0141327 A1 | * | 6/2009 | Penn et al. .................. 359/201.1 |
| 2009/0296242 A1 | * | 12/2009 | Callen et al. .................. 359/834 |
| 2009/0297490 A1 |   | 12/2009 | Nakamura et al. |

* cited by examiner

*Primary Examiner* — Abdullahi Nur

(74) *Attorney, Agent, or Firm* — Wagenknecht IP Law Group PC

(57) ABSTRACT

A prism including a substrate faceted to provide a plurality of flat surfaces, wherein at least two of the plurality of surfaces, each including a filter coating, form at least two filter surfaces, wherein each filter surface selectively permits passage of a predetermined wavelength and reflects remaining wavelengths along an optical path towards another of the plurality of surfaces, optionally another filter surface, wherein an angle of incidence of each of the plurality of surfaces along the optical path is equal or nearly equal. An apparatus incorporating the prism and its use for splitting a light spectrum into a plurality of wavelengths or wavelength ranges.

18 Claims, 11 Drawing Sheets

DEVICE FOR SPLITTING LIGHT INTO COMPONENTS HAVING DIFFERENT WAVELENGTH RANGES AND METHODS OF USE

CROSS REFERENCE TO RELATED APPLICATIONS

This application claims benefit of priority to U.S. provisional patent application Ser. No. 61/549,379, filed Oct. 20, 2011; the contents of which are herein incorporated by reference in their entirety.

TECHNICAL FIELD

The present invention relates generally to the field of optics and more specifically to a prism, an apparatus incorporating the prism and its use for splitting a light spectrum into a plurality of wavelengths or wavelength ranges by selectively delivering the light spectrum across a series of filtering surfaces of the prism. Uses for the prism and apparatus include systems and methods for flow cytometry, multiple fluorescent color detection methods, fluorescent microscopy, and optical detection systems and methods requiring splitting of light into components having different wavelength ranges.

BACKGROUND OF THE INVENTION

A number of optical instruments require the splitting of light across a wide wavelength spectrum into a number of components corresponding to narrow wavelength bands. For example, fluorescent microscopes often incorporate light splitting technologies to distinguish between cells or cell types labeled with different fluorescent (FL) molecules. This is accomplished by subjecting the fluorescently labeled cells to one or more excitation wavelengths, such as from one or more lasers tuned to excite the particular fluorescent molecules, and filtering or separating the wavelength or wavelength range of interest from the entire emission spectrum for viewing. Traditionally, to achieve such wavelength separation, the light of emission spectrum (or simply, emission spectrum) is passed along multiple dichroic mirrors. As the light spectrum passes these serial dichroic mirrors, light within certain wavelength bands are separated out sequentially based on the properties of each dichroic mirror.

Similarly, in flow cytometry, biological cells or particles can be identified from one another in biological samples based on labeling with fluorescent molecules. The FL light is emitted from labeled cells as they pass through a laser beam in a flow channel travelling along a certain optical path. Since a cell may have a variety of markers indicative of its identity or status often two, three or more different fluorescent labels are used simultaneously requiring the instrument to have multi-color fluorescence detection capabilities. Separation and detection of these multi-color fluorescent wavelengths from the total emission spectra due to the multiple fluorescent labels is further complicated by additional measurements of forward scatter (FSC) and even more problematic, side scatter (SSC), which also require detection after exposure to the laser beam(s). Separation and detection of individual wavelengths or wavelength ranges within the emission spectrum is accomplished by directing the spectrum along a path where it is passed through a range of dichroic mirrors and filters, so that particular wavelength ranges are split sequentially from the wider emission spectrum and delivered to the appropriate light detectors. For example, cells of different lineages (e.g. blood cells) can often be distinguished from one another based on the presence of different protein markers (that may or may not be on the cell surface) and thus antibodies against these markers can be conjugated to different fluorescent molecules for their detection or measurement. When cells are labeled with antibodies conjugated to the popular fluorescent dyes such as fluorescein (FITC) and phycoerythrin (PE), each can be excited simultaneously, using a laser at 488 nm. In response, FITC emits FL light ranging from 470 to 610 nm, with a peak around 530 nm, whilst PE emits FL light ranging 530 to 660 nm, with a peak around 600 nm. Before separating and detecting the individual FITC and PE FL signals, the total FL light emitted from the cells is collected typically by an objective lens (single lens or a group of lenses) at 90° to the traveling direction of excitation laser. This total spectrum also includes the side scatter light at 488 nm. Once collected, separation and detection of side scatter as well as FITC and PE FL light can be accomplished as overviewed in FIG. 1 and as follows:

(a) The FL light coming from the objective lens is directed through, first, a 502 nm short-pass filter (i.e., passing light with wavelengths <502 nm whilst reflecting light >502 nm, wherein the passing light is then directed through a 488/10 nm band-pass filter to an optical detector such as photomultiplier tube (PMT) or photodiode for side scatter signal);

(b) The light reflected from the 502 nm short-pass filter is then directed through a second 556 nm long-pass filter (i.e. passing light with wavelengths >556 nm, whilst reflecting light <556 nm);

(c) The light reflected from the 556 nm long-pass filter is then directed through a 530/30 nm band-pass filter for an optical detector such as a PMT for FITC color detection;

(d) The light passing through the 556 nm long-pass filter is then directed through a 585/25 nm band-pass filter for an optical detector such as a PMT for PE color detection.

The above approaches and other similar approaches require the use of multiple dichroic mirrors and band-filters for splitting light into its components having different, narrow wavelength bands. These approaches, whilst being adopted in many types of optical instruments, such as flow cytometers or some fluorescent microscopes, suffer from a number of limitations or shortcomings due to the use of a large number of optical components, such as: (1) high component cost; (2) lengthy and complicated optical alignment processes to achieve proper and efficient light splitting; and (3) large space requirements to cope with multiple components as well as their holders and to avoid spatial/mechanical interference between these components.

Thus, there remains a need to develop new optical light-splitting technologies which have simplified optical alignment procedures, occupy a small space and result in a lower cost.

SUMMARY OF THE INVENTION

The invention addresses the above deficiencies in optic-based systems and provides related benefits. In one aspect of the invention a prism is provided, which includes a substrate faceted to provide a plurality of surfaces. By faceting it is meant that neighboring flat surfaces are separated by angles therebetween. For at least two of the plurality of surfaces, each of the at least two surfaces comprises an optical coating to form a filter surface, which selectively permits passage of light of a predetermined wavelength or wavelength range. Remaining or un-passed wavelengths are reflected along an optical path within the prism towards a second optically-coated surface. The second coated surface selectively permits passage of a second predetermined wavelength or wavelength range and reflects the remaining un-passed wavelengths to another of the surfaces along the optical path. The optical path is further defined by providing the angle of incidence at each of the plurality of surfaces as the same or equal or nearly same or nearly equal along the optical path.

The filter surfaces define the selective passage of light of particular wavelengths or wavelength ranges from the prism along the optical path. In some embodiments, the coated surface is a long-pass filter to selectively permit passage of wavelengths equal or greater than the predetermined wavelength. In other embodiments the coated surface is a short-pass filter to selectively permit passage of wavelengths equal or less than the predetermined wavelength. In still other embodiments the filter surface is a band-pass filter to selectively permit passage of wavelengths within one or more predetermined wavelength ranges.

By configuring the filter surfaces along the optical path, a variety of passage configurations can be developed. In one approach a plurality of long-pass filters are provided in a descending sequence to selectively permit passage of wavelengths in a decreasing sequence as the remaining light travels along the optical path or along the series of long-pass filters. Thus, this embodiment permits the passage of shorter and shorter wavelengths as the optical path continues within the prism. In another approach a plurality of short-pass filters are provided in an ascending sequence to selectively permit passage of wavelengths in a increasing sequence as remaining light travels along the optical path or along the series of short-pass filters. Thus, this embodiment permits the passage of longer and longer wavelengths as the optical path continues within the prism. In still another approach a plurality of band-pass filters are provided that selectively permit passage of different wavelengths along the series. In still another approach long-pass, short-pass and band-pass filters are combined in series to selectively permit passage of longer wavelengths, shorter wavelengths, wavelength ranges and the like. This separation of a light spectrum or emission spectrum into its narrower wavelength components or ranges can be achieved at least in part by coating the plurality of surfaces with a long-pass filter coating, a short-pass filter coating, a band-pass filter coating and the like. Furthermore, the position of the photodetector to detect light exited from each filter surface should be placed in consideration of the angle of refraction at the corresponding surface. Positioning can be performed using any suitable means such as those that permit positioning across one, two or three spatial dimensions, rotational positioning, and the like.

The filter surfaces permit the selective passage and thus separation of a variety of fluorescent emissions commonly used in the biological arts. Among those of particular interest include a fluorescent molecule, fluoroscein (FITC), phycoerythrin (PE), Cy-chrome, aminomethylcoumarin (AMCA), cyanine (Cy2), indocarbocyanine (Cy3), allophycocyanin (APC), texas red, a fluorescent protein (FP), green fluorescent protein (GFP), red fluorescent protein (RFP) and the like. In addition, when used in flow cytometry or the like, the prism may also split side scatter (SSC) emission for detection. In some embodiments light spectrum or emission spectrum is split or separated to measure or detect wavelengths of 735 nm or greater, 655-735 nm, 595-655 nm, 556-595 nm, 502-556 nm, 480-502 nm, and 480 nm or less.

In preferred embodiments the prism receives an optical signal, such as a light spectrum or sample emission spectrum through an entry surface. An entry surface may be coated with an antireflective coating to maximize receipt or entry of the light spectrum or the sample emission spectrum. In such embodiments, the entry surface directs the incoming spectrum towards one of the plurality of surfaces, preferably one of the coated surfaces functioning as a filter, to pass along a defined optical path inside the prism and thus enables the selective delivery of the light spectrum to each of the filter surfaces for selective splitting or separation of the spectrum into its narrower component wavelengths of interest.

In some embodiments a first entry surface for a first light source (or a first emission spectrum) also functions as an exit surface for a second light source (or a second emission spectrum) and a second entry surface for a second light source (or a second emission spectrum) also functions as an exit surface for the first light source (or a first emission spectrum). Thus, in some embodiments a same surface may be either an entry surface for receiving a spectrum or an exit surface for exiting remaining components of a filtered or split spectrum.

In another aspect of the invention an apparatus for the selective measurement or detection of a plurality of wavelengths or wavelength ranges from a light spectrum or emission spectrum is provided. The apparatus includes an activation source, such as a light source, directed to a sample region to induce an emission spectrum of a sample; a prism, as provided herein, in optical alignment to receive an emission spectrum from the sample region; and at least two detectors, each in optical alignment with filter surfaces of the prism to measure or detect passage of predetermined wavelengths split from the light or emission spectrum. In some embodiments the apparatus is a flow cytometer, a fluorescent microscope or a fluorescent detector.

In another aspect of the invention a method for selectively measuring or detecting a plurality of wavelengths from an emission spectrum is provided, which includes: providing an apparatus with prism as provided herein; positioning a sample in the sample region; activating a light source to induce emission of a spectrum from the sample; and measuring the predetermined wavelengths passed from each of the filters of the prism as provided herein.

DESCRIPTION OF PREFERRED EMBODIMENTS

Figure 1:
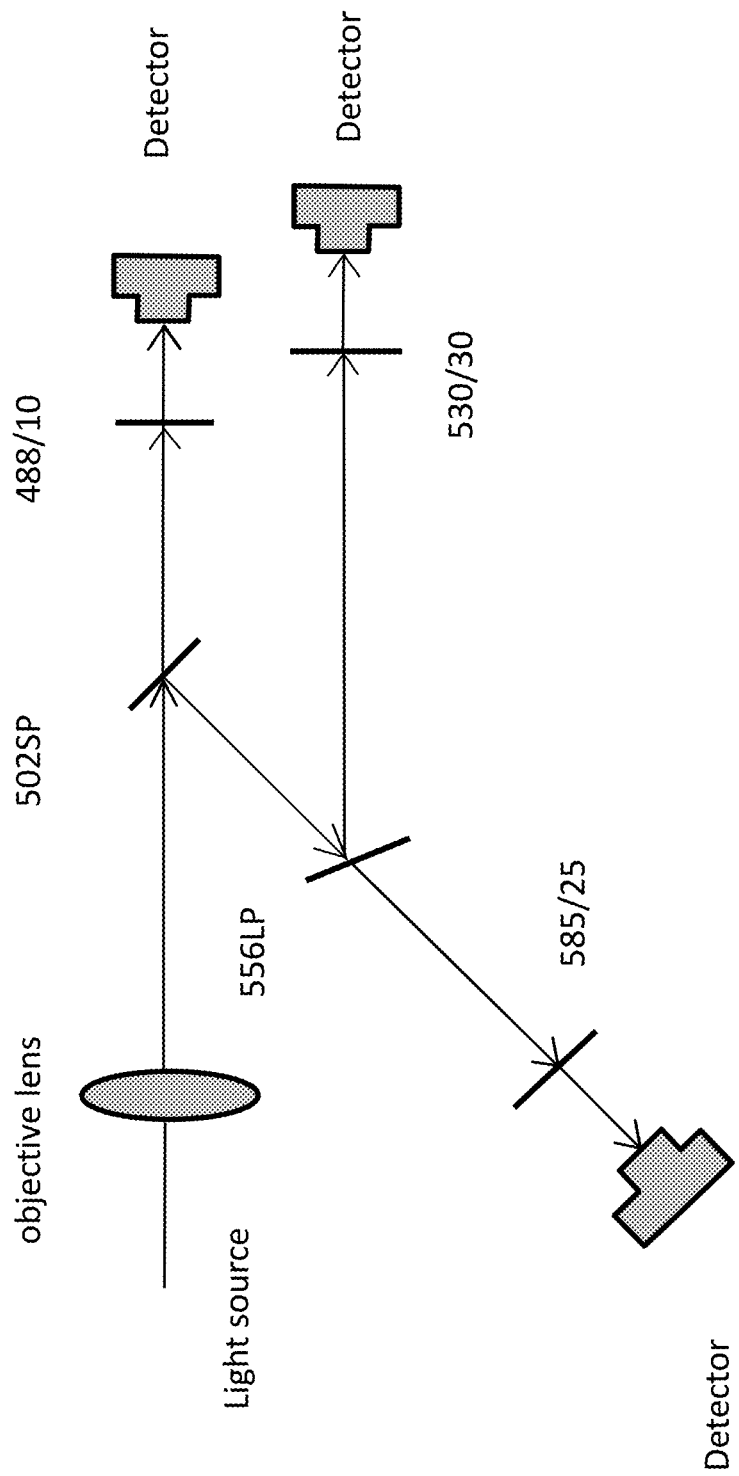
FIG. 1 is a schematic representation of a conventional optical system used for splitting a light spectrum into its components having wavelength ranges of 488/10 nm (side scatter); 530/30 nm (FITC) and 585/25 nm (PE).

The invention provides an optical device capable of splitting light into two or more components having different wavelength ranges. The device is a prism with multiple faces and surfaces optically-coated to form a plurality of optical filters, which selectively permit passage of light having certain wavelengths from the prism while reflecting remaining wavelengths along an optical path inside the prism to another optical filter. Thus, when a collimated (or nearly collimated) light beam is introduced into the prism it follows a defined optical path along a series of coated surfaces capable of limiting outward passage of wavelengths according to predetermined wavelength frequencies, which can then be detected or measured while the remaining spectrum components are reflected to the next coated surface, which generally permits passage of a different frequency or frequency range, which can be detected separately.

A light spectrum or emission spectrum introduced into the prism generally includes a wide frequency spectrum; however, narrower frequency spectrums may also be introduced. A light spectrum or emission spectrum may be provided from any suitable source. In some embodiments the light spectrum is received from one or more fluorescent molecules after excitation. Fluorescence is a form of luminescence that involves the emission of light by a substance in response to the absorption of light or other radiation at a different wavelength. Typically, a molecule fluoresces at a wavelength longer than that of the excitation wavelength. A variety of technologies rely on the detection of fluorescent molecules and thus a variety of fluorescent molecules having different wavelengths have been developed. Accordingly, simultaneous or near simultaneous excitation of two, three, four or more fluorescent molecules would emit fluorescent light of a wide frequency spectrum for collection and thus would require splitting of collected fluorescent light into its two, three, four or more components for individual detection or measurement. Thus, the selective passage of predetermined frequencies or wavelengths permits the prism to detect or measure multiple fluorescent light components within a sample that are labeled with a plurality of different fluorescent markers.

In addition to fluorescent labeling, cell populations themselves may also scatter excitation light. For example, in addition to fluorescent molecules, flow cytometry often relies on measurement or detection of the scatter light at excitation wavelength (or spectrum) due to the presence of cells. That is, flow cytometry also uses forward scatter (FSC) and side scatter (SSC) for preliminary identification of cells. In addition, forward and side scatter are traditionally used to define gates or boundaries to exclude debris and dead cells from analysis. As such, the prism also permits the separation of wavelengths, such as those characterized as side scatter, that do not require additional fluorescent labeling.

The skilled artisan will appreciate that the invention will facilitate the advancement of a number of scientific areas including biological studies, where multiple fluorescent labels are combined to detect and measure subsets of cell populations, such as T-cells (i.e. CD3+, CD4+, CD7+), B-cells (i.e. CD19+), macrophages (CD11b+, CD14+) and the like and to identify or measure even further subpopulations of cell subsets to further investigate medical consequence, stage of differentiation, and the like. Further, the invention permits the use of fluorescently labeled antibodies or other binding molecules specific to various cell surface or internal moieties that are commercially available from a variety of sources, such as Becton Dickenson (Franklin Lakes, N.J., USA).

The skilled artisan will appreciate cell populations may be obtained from a variety of biological samples, such as but not limited to blood or serum, tissue, and the like as known in the biological fields. Cells may be separated from biological samples, such as by filtration, or may be provided from cell lines as known in the biological arts. Further, artisans skilled in technologies such as flow cytometry and fluorescent microscopy are also familiar with numerous methods of cell harvesting from biological samples as well as their labeling, such as through fluorescently labeled antibodies, staining and the like.

As introduced above, an emission spectrum from a sample can be obtained by exposing the sample to a radiation source, such as electromagnetic radiation in the form of light or intense heat. In the case of minerals or non-living samples heat can be effective; however, when detecting or measuring biological samples, such as live cells, folded proteins and the like, that are labeled with fluorescent molecules, a suitable light source is preferred. Most often lasers or light-emitting diodes (LED) are used to excite biological samples and their labels to emit an emission spectrum. A variety of lasers are known in the present art and have been used to excite samples. These lasers have been incorporated into a variety of cell-based and molecule-based detection systems such as flow cytometry, fluorescent microscopy, microfluidic detection and the like and are useful in the systems provided herein.

Generally, the preferred excitation source is a light source that is collimated or nearly collimated, a light whose rays are parallel or nearly parallel. Accordingly, delivery of a suitable excitation frequency may include the use of filters, lenses and the like to tune the excitation source to the desired characteristics. Similarly, the excitation source may be delivered using any suitable means such as through lenses, fiber optic cable and the like as known in the art.

As introduced above, populations such as biological samples can be exposed to an excitation source to induce emission of a light spectrum. Since the excitation source is generally limited to a desired spatial position, often there exists a sample region for appropriately housing or channeling the sample for exposure to the excitation source. Accordingly, a sample region for exposure of the sample to the excitation source can be provided in any suitable form such as a flow channel including those known in the flow cytometry arts, microfludic channels, flow cuvette, tissue culture vessels, petri dish, microtitre plates, microscopic slides and the like. The skilled artisan will appreciate that the excitation source can itself directly target the sample region or can be directed towards the sample region through one or more lenses, filters, fiber optic cables or like.

The prism of the invention is optically aligned to receive the emission spectrum or light spectrum at an appropriate surface of the prism, herein referred to as an "entry surface". This can be done by adjusting the spatial position of the prism using a suitable positioning means and can include one or more collecting lenses and the like. Generally, an entry surface is coated with an anti-reflection coating to encourage entry of the spectrum into the prism and thus reduce or prevent reflection. Anti-reflection coatings are commercially available from a variety of instrument supply companies, such as Edmund Optics (Barrington, N.J., USA). Once entering the prism, the spectrum proceeds along an optical path towards a series of filter surfaces. Defining the optical path along the inside of the prism is determined by appropriate angling of each of these surfaces. Angling the surfaces can be performed using cutting, slicing, polishing, or faceting technologies known to those skilled in the art of prism or crystal fabrication and the like. Each filter surface, which is formed by coating the prism surface or face with one or more coatings, permits the selective passage of a predetermined wavelength or wavelength range for subsequent detection or measurement. The remaining spectrum is reflected inward and thus continues along the series of filter surfaces where further separation is performed by permitting the selective passage of other predetermined wavelengths or wavelength ranges. Ultimately, the last remaining components of the spectrum can exit the prism via an exit surface, which is preferably not coated with a filter coating.

The optical path through the prism as well as the refraction angles depend at least in part from the prism material as well as the surface angles. In a preferred embodiment, the prism is made of optically transparent glass material, such as BK7, BSC-7, BSL-7 or the like. The preferred requirement for various tolerances of such a prism may include: surface accuracy: $\frac{1}{4}\lambda$@635 nm, dimensional tolerance: ±0.1 mm; and angle tolerance: +/−1 arc minute (+/−one sixtieth (1/60) of one degree). There may be other requirements relating to manufacturing qualities of such prism, such as surface quality and aperture local tolerance. The tolerance numbers listed above are for illustrative purposes and are not intended in any way to limit the scope of the present invention. Those skilled in the art could readily determine appropriate tolerances for various dimensions or parameters of the prism based on specific applications of such a prism.

Prisms can be categorized into different types depending on passage characteristics of each filter surface, which are defined by a corresponding surface optical coating. For instance, a long-pass filter type can be formed by applying a long-pass filter coating to a prism surface, a short-pass filter type can be formed by applying a short-pass filter coating to a prism surface, and a band-pass filter type can be formed by applying a band-pass filter coating to a prism surface. Accordingly, the prism is designed in such a way so that when entered light travels straightly and hits the first coated prism surface, light above certain wavelength (for long-pass type) or below certain wavelength (for short-pass type) or within a wavelength range (for band-pass type) will pass through the coated surface and exit the prism, thereby permitting its selective detection. Meanwhile, the remaining light components are reflected back into the prism and are directed to the next coated surface, which preferably has a different coating at a shorter cutoff wavelength (for long-pass type) or at a longer cutoff wavelength (for short-pass type) or at another wavelength range (for band-pass type) compared to the cutoff or band-pass wavelength of the first coated surface. Since the filter surface selectively permits passage of some wavelengths and reflects others along the optical path, at each coated surface, the angle of the incidence of the light should not be too large to ensure properly balance of light transmission through the coating and the light reflection into the prism. In a preferred embodiment, the angle of incidence of the light at each coated surface along the optical path within the prism is the same value, e.g. 10 deg for the prism shown in FIG. 2A and FIG. 2B. In other embodiments the angle of incidence is nearly the same, such as between 3 deg and 18 deg. In this way, when the light hits each coated surface of the prism sequentially, the components of different wavelength ranges will exit the prism (i.e. passing through a coated surface), depending on the filtering properties of each coating on the surfaces.

Clearly, the optical coatings on each surface play critical roles for the prism. These optical coatings operate the same way as those in dichroic filters or mirrors. Specifically, on each surface layer of optical coatings, different refractive indexes are built up. The interfaces between layers of different refractive indexes produce phased reflections, selectively reinforcing certain wavelengths of light and interfering with other wavelengths. By controlling the deposited material types, thickness and number of the layers, the cutoff wavelength or frequency for the long-pass or short-pass or band-pass filters at each surface of the prism of the present invention can be tuned with required steepness and width (for band-pass filters).

A number of thin film coating methods could be used for producing the optical coatings for the prism of the present invention, including, but not limited to RF and DC sputtering, thermal evaporation, ion-assisted E-Beam evaporation, reactive sputtering, low pressure chemical vapor deposition (LPCVD), plasma-enhanced chemical vapor deposition (PECVD) and the like. Depending on the filter type as well as filter characteristic parameters, a wide range of materials could be used for the optical coatings, including, but not limited to, copper (Cu), gold (Au), hafnium oxide ($HfO_2$), ITO (Indium Tin Oxide), magnesium oxide (MgO), Nickel (Ni), silicon monoxide (SiO), silver (Ag), titanium dioxide ($TiO_2$), tantalum oxide ($Ta_2O_5$), zirconium oxide ($ZrO_2$). Those skilled in the art of producing optical thin film coatings for different types of filters could readily choose/determine appropriate types of coating materials, the number of coated layers, thickness of the coated layers, alteration-sequences of the coating materials, and other coating parameters based on the type and characteristics of the filters being produced. A large number of commercial companies, such as Materion Corporation (Mayfield Heights, Ohio, USA), Deposition Sciences Incorporated (Santa Rosa, Calif., USA) and Reynard Corporation (San Clemente, Calif., USA), provide services for producing such optical thin film coatings to generate a variety of filter types.

The filtered light that selectively passes from and thus exits the prism from each coated surface is preferably filtered by a subsequent band-pass filter and is detected by an optical detector. A variety of suitable optical detectors are known in the art, such as photomultiplier tubes (PMTs), Avalanche Photodiodes (APD) and the like, which permit detection of a variety of wavelengths, thus achieving effective splitting and detecting of light components with different wavelengths from the wider emission spectrum. Thus, analysis systems such as signal processing circuits and firmware coupled to PMTs, APDs or the like can determine the presence, absence or amount of a variety of distinct wavelengths or wavelength patterns, thereby permitting the use of multi-color fluorescence in a variety of instrumentation.

According to the Pythagorean theorem and theories of the propagation of light along a straight line, the tolerance of the angle of incidence on each surface is independent of the tolerance at prior reflective surfaces and thus variations of the angle of incidence would not sequentially increase as the remaining spectrum proceeds along each reflective surface along the optical path. That is to say, for example, if the angle of incidence of the optical path throughout all the surfaces is designed to be 10 deg as a target value and the actual angles of incidence is 1 deg off from the target value for the second surface, such variation would not accumulate to significantly deviate from the target value at follow-on or subsequent surfaces along the optical path.

Furthermore, based on Snell's Law, at each surface, we can determine the emergence angle of light (or angle of refraction after light passing through each surface from the prism-inside to the air-outside of the prism), which is useful for determining the location of subsequent optical filters/sensors/detectors for measuring the light exiting from the surface of interest. Note that for a long-pass type prism, the cut-off wavelengths at subsequent surfaces along an optical path would be in a decreasing order to permit passage of shorter wavelengths as the reflected light is directed and travels along the optical path inside the prism. For a short-pass type prism, the cut-off wavelengths at subsequent surfaces would be in an increasing order to permit passage of longer wavelengths as the reflected light is directed and travels along the optical path inside the prism. For a band-pass type prism, the band-pass wavelengths at subsequent surfaces may be in an increasing or decreasing order to permit passage of longer or shorter wavelengths as the light is directed and travels along the optical path inside the prism. In other embodiments of a band-pass type prism, the band-pass wavelengths at subsequent surfaces may not follow particular increasing or decreasing order. Indeed, it is possible to have a range of bass-pass wavelengths that are mixed in order as light traveling along the optical path inside the prism and is reflected at subsequent surfaces.

In other embodiments, the prism of the present invention has a mixture of long-pass filters, short-pass filters, and band-pass filters at different prism surfaces. For example, as shown in FIG. 2D, Surface 2 through Surface 7 can be long-pass filters and short-pass filters arranged in an alternative manner so that Surface 2, 4 and 6 are long-pass filters with decreasing cut-off wavelengths and Surface 3, 5 and 7 are short-pass filters with increasing cut-off wavelengths. Furthermore, for the prism shown in FIG. 2D, the cutoff wavelength for Surface 2 is at longest-wavelength range of the light spectrum to be split and the cutoff wavelength for Surface 3 is at shortest-wavelength range of the light spectrum to be split. In still other embodiments of the prism of present invention including such mixed long-pass and short-pass filters, it is not necessary to have "long-pass filters" and "short-pass filters" arranged in an alternate manner, as long as the cut-off wavelengths for long-pass filters decrease along the light passage and the cut-off wavelengths for short-pass filters increase along the light passage.

Figure 2A:
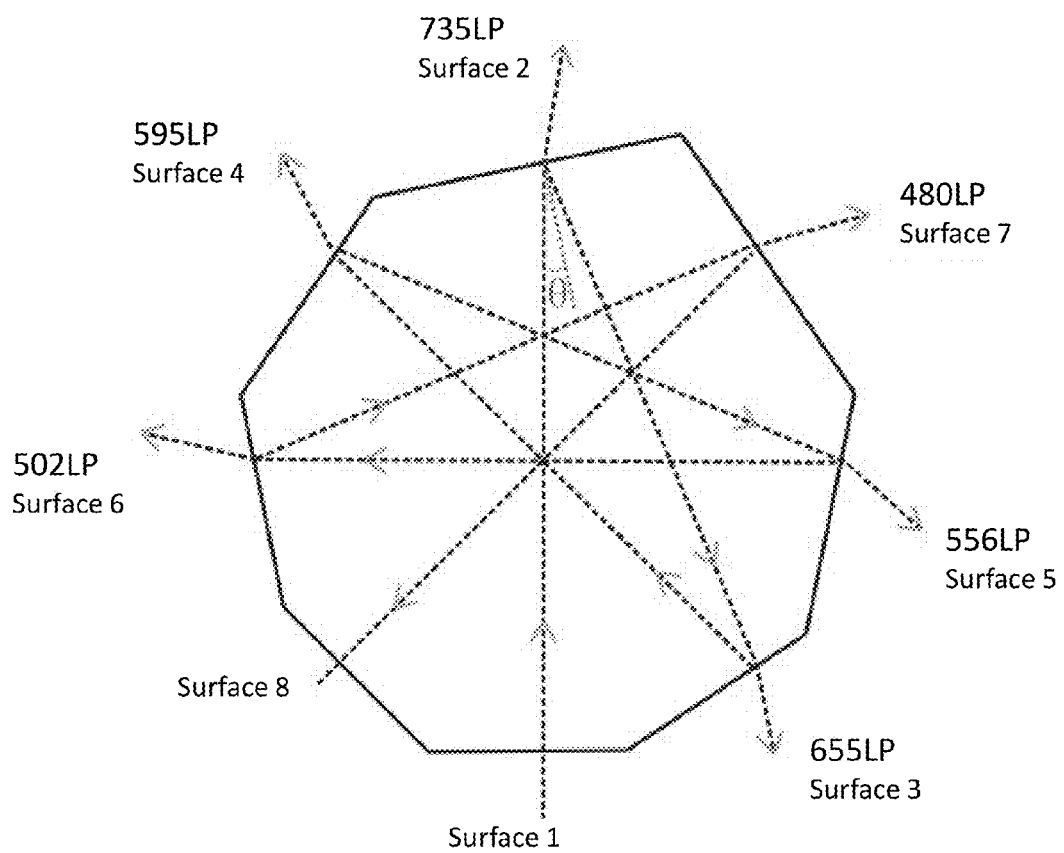
FIG. 2A is a schematic showing a series of flat surfaces coated with an optical coating to provide a multiple-faced prism capable of sequentially splitting light into components having the following wavelength ranges: >735 nm; 655-735 nm; 595-655 nm; 556-595 nm; 502-566 nm; 480-502 nm, <480 nm. The angle of refraction as the light exits the prism and enters the free space (i.e. air) at different surfaces can be determined using Snell's Law and the angle of incidence of the light at each surface.
Figure 2B:
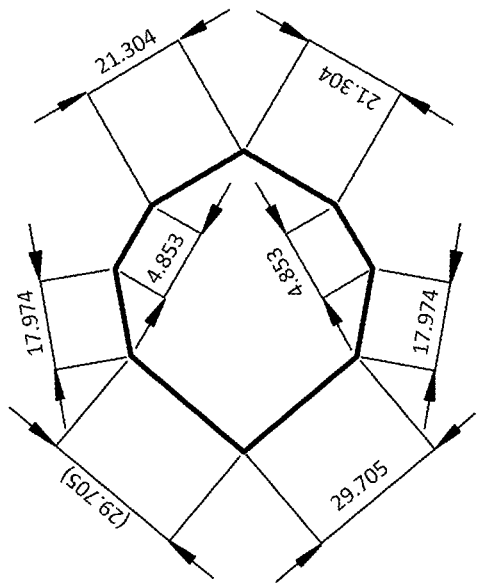
FIG. 2B shows geometrical dimensions of an exemplary prism of FIG. 2A. The figure on the left indicates the angle of neighboring surfaces. The figure in the middle shows the thickness of the exemplary prism being 16 mm. The figure on the right shows the dimensions (in mm) of each surface length along an optical path of an exemplary prism.
Figure 2B:
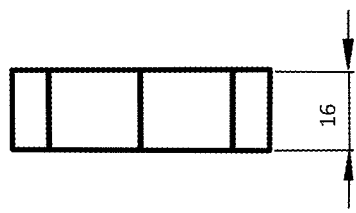
Figure 2B:
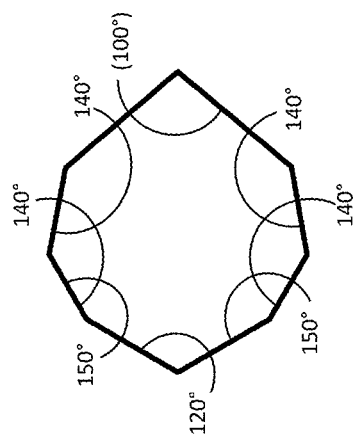

An example of a long-pass prism is depicted in FIG. 2A in which light splitting is achieved as follows:

(a) A collimated light beam is directed to an entry surface, labeled as Surface 1, through optical fiber or other optical coupling means.

(b) An anti-reflective coating on Surface 1 encourages the light to enter the prism at an angle of incidence of zero degree, and is first directed along an optical path towards a first filtering surface or an optical-filter surface referred to as Surface 2.

(c) Surface 2, having one or more layers of an optical coating, possess a filter property permitting light above 735 nm to pass through and exit the prism, whilst light below 735 nm is blocked from passage and reflected back to the prism thereby continuing along the optical path, which subsequently directs the remaining spectrum to a second coated surface, labeled as Surface 3. In the exemplary prism shown in FIG. 2A, the angle of incidence at Surface 2 for the light is 10 deg whilst the angle of refraction at Surface 2 or the angle in which light >735 nm exits the prism and enters the air is 15.21 deg. The angle of refraction is calculated based on Snell's law and using refractive index of 1.51118@780 nm for N-BK7 glass material, where refractive index information is from http://refractiveindex.info/?group=GLASSES&material=BK7 (accessible as of the filing date hereof), as an example. The angle of refraction at additional Surfaces 3-7 is also be determined to be from 15.24 deg @675 nm to 15.33 deg@488 nm based on Snell's Law; the angle of incidence of the light at these surfaces each also being 10 deg.

(d) Surface 3, having one or more layers of an optical coating(s), possess a filtering property such that light above 655 nm can pass through and exit the prism, whilst light below 655 nm is reflected back to the prism thereby continuing along the optical path and thus is subsequently directed to Surface 4.

(e) Surfaces 4, 5, 6, and 7 each also have one or more layers of an optical coating(s) to permit passage of light having wavelengths above 595 nm, 556 nm, 502 nm, and 480 nm, respectively. Surface 7, whilst permitting light above 480 nm to pass through and thus exit the prism, reflects light below 480 nm back to the prism thereby continuing along the optical path and is subsequently directed to Surface 8.

(f) There is no filtration coating on Surface 8. Thus, light below 480 nm is permitted to exit the prism at Surface 8. So far, light entering the prism is spilt into component wavelengths of >735 nm, 655-735 nm, 595-655 nm, 556-595 nm, 502-556 nm, 480-502 nm, and <480 nm.

It is important to note that in above descriptions of long-pass filtering properties, we have used ideal filters for better illustration and discussion. For example, for a long-pass filtering Surface 2 in FIG. 2A, it is indicated that the filtering Surface 2 would permit light above 735 nm to pass through and exit the prism, whilst light below 735 nm is reflected inward to the prism. For a practical long pass filter having a cutoff wavelength of 735 nm, the transmission efficiency through the filter Surface 2 may be 90% or higher, for wavelengths above 740 nm, and may gradually decrease with decreasing wavelength to ~50% at 735 nm and to a few percent or even lower at wavelengths below 730 nm. In this case, the transmission efficiency has a transition range of 735±5 nm. Correspondingly, the reflection efficiency at the filter Surface 2 may be 95% or above for wavelength below 730 nm, and may gradually decrease with decreasing wavelengths to ~50% at 735 nm and to less than 10% or even lower at wavelengths above 740 nm. Thus, the reflection efficiency also have a transition range of 735±5 nm. Thus, the practical short-pass filters would have a transition wavelength range over which the filtering surface property changes from transmission at a higher efficiency to reflection at a higher efficiency, as the wavelength increases. The above mentioned transmission efficiency numbers, reflection efficiency numbers as well as transition wavelength ranges are for illustration purposes.

For Surfaces 2 through 7 in FIG. 2A, a preferred requirement for the long pass filters on each of these filters is that the transmission is greater than 90% for wavelengths above the transition range whilst reflection greater than 98% for wavelength ranges below the transition range. In a further exemplary embodiment, there is an anti-reflective coating on Surface 1, with an AR ratio less than 1.5% for a wavelength range of 400-820 nm. There are a number of other parameters related to the coatings on Surfaces 2 through 7 such as long-pass wavelength tolerance, long pass transmission slope, etc. Those who are skilled in the art can readily determine appropriate requirements for these coatings.

Figure 2C:
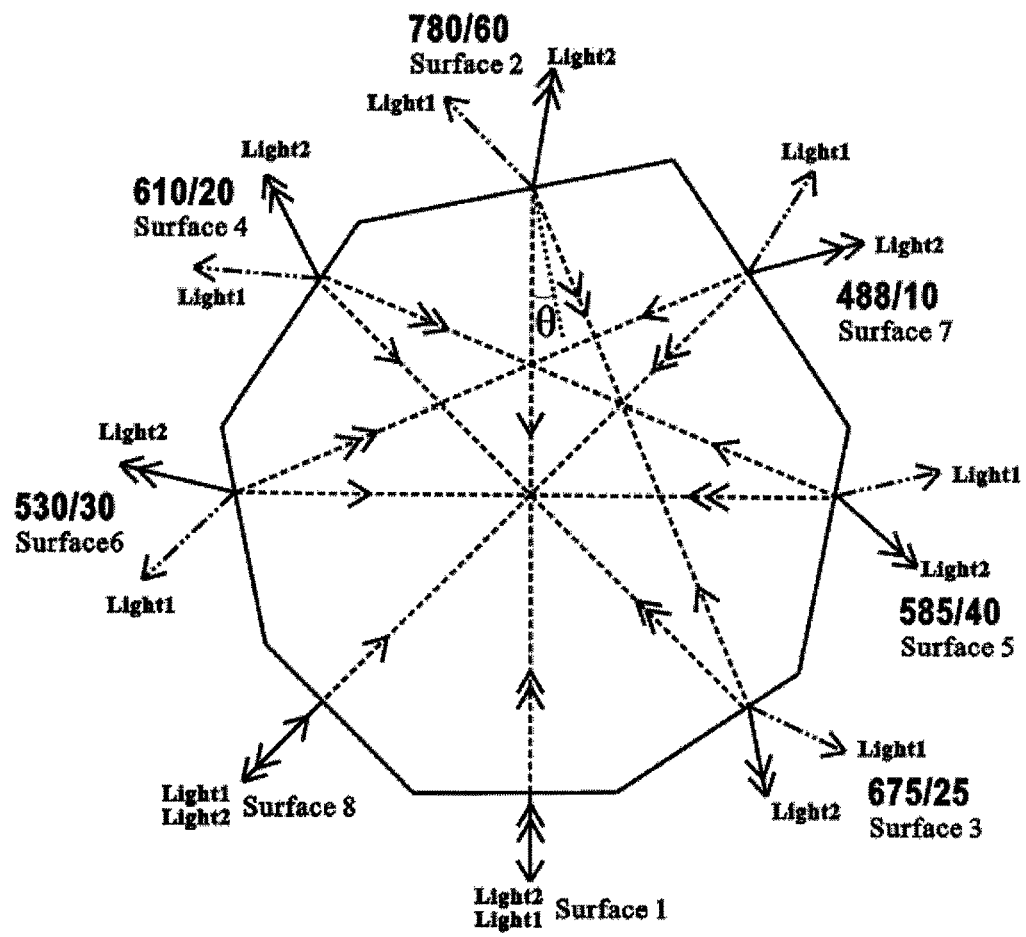
FIG. 2C shows an exemplary method of using a multiple-faced prism for the separation of wavelengths from two emission spectra (Light 1 & Light 2), the prism having band-pass filters on Surface 2 through Surface 7 for splitting Light 1 and Light 2, wherein Light 1 enters the prism from Surface 8 and Light 2 enters the prism from Surface 1. The traveling or optical path and thus direction of Light 1 is marked with single arrow whilst the traveling or optical path and thus direction of Light 2 is marked with double arrow.
Figure 2D:
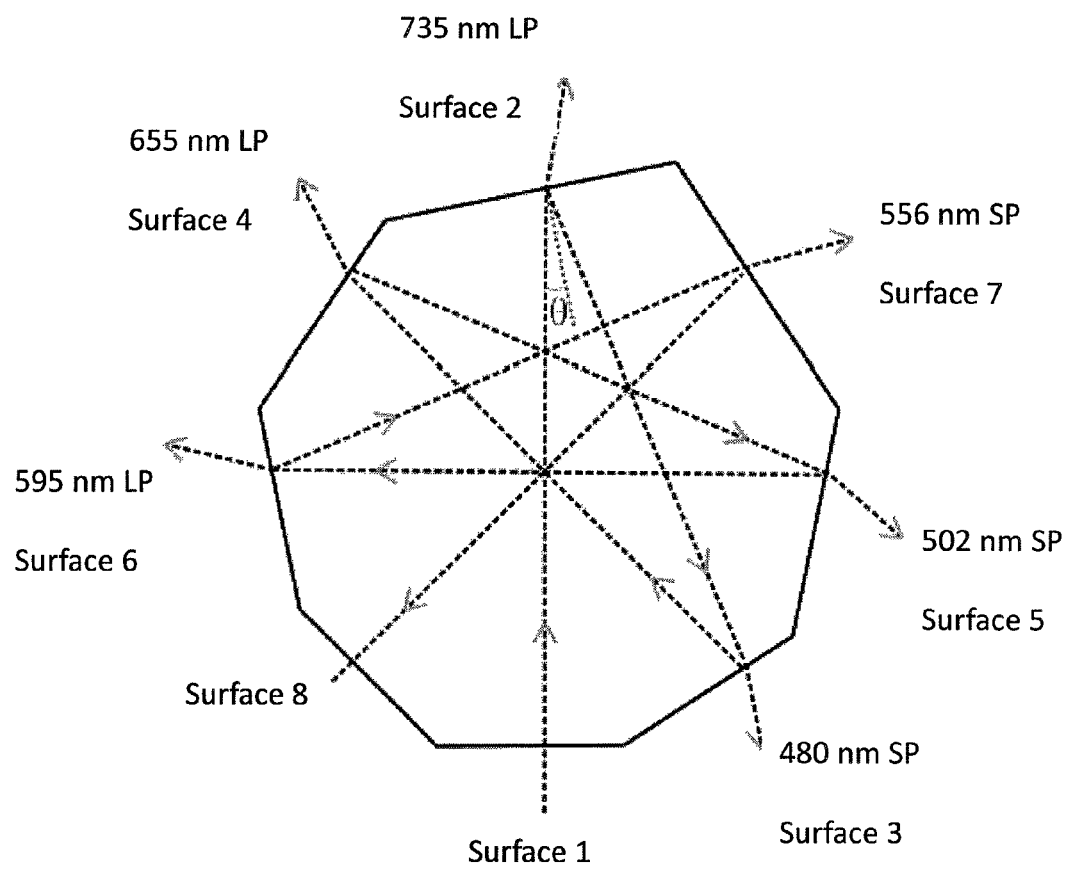
FIG. 2D shows an exemplary method of using a multiple-faced prism having a combination of long-pass filters and short-pass filters on Surface 2 through Surface 7 for splitting light into wavelength components along an optical path. The prism is configured to split light into components with following wavelength ranges: >735 nm (Surface 2); 655-735 nm (Surface 4); 595-655 nm (Surface 6); 556-595 nm (Surface 8); 502-566 nm (Surface 7); 480-502 nm (Surface 5) and <480 nm (Surface 3).

In the above exemplary method of use, splitting light using the prism in FIG. 2A was based on the example of light entering the prism from Surface 1; however, in another approach or method of use, a prism having band-pass coatings on Surfaces 2 though 7 would provide a series of band-pass filters, which permits splitting a light spectrum or emission spectrum from two sources. This can be accomplished by receiving a first emission spectrum (i.e. light from a first source) at Surface 1 and receiving a second emission spectrum (i.e. light from a second source) at Surface 8. That is, Surface 1 may function as a receiving or entry surface and Surface 8 may function as an exiting surface for a first emission spectrum; and Surface 8 may function as a receiving or entry surface and Surface 1 may function as an exiting surface for a second emission spectrum. The schematic representation of the prism splitting light from two sources is shown pictorially in FIG. 2C.

Another example of a prism in depicted in FIG. 2D in which mixed long-pass and short-pass filters are arranged at different Surfaces of the prism and light splitting is achieved as follows:

(a) A collimated light beam is directed to an entry surface, labeled as Surface 1, through optical fiber or other optical coupling means.

(b) An anti-reflective coating on Surface 1 encourages the light to enter the prism at an angle of incidence of zero degree, and is first directed along an optical path towards a first filtering surface or an optical-filter surface referred to as Surface 2.

(c) Surface 2, having one or more layers of an optical coating, possess a long-pass filter property permitting light above 735 nm to pass through and exit the prism, whilst light below 735 nm is reflected inward to the prism thereby continuing along the optical path, which subsequently directs the remaining spectrum to a second coated surface, labeled as Surface 3. In the exemplary prism shown in FIG. 2D, the angle of incidence at Surface 2 for the light is 10 deg whilst the angle of refraction at Surface 2 or the angle in which light >735 nm exits the prism and enters the air is 15.21 deg. The angle of refraction is calculated based on Snell's law and using refractive index of 1.51118@780 nm for N-BK7 glass material, where refractive index information is from http://refractiveindex.info/?group=GLASSES&material=BK7 (accessible as of the filing date hereof), as an example. Therefore, light with wavelength >735 nm can be detected at the exit of Surface 2.

(d) Surface 3, having one or more layers of an optical coating(s), possess a short-pass filtering property such that light below 480 nm can pass through and exit the prism, whilst light above 480 nm is reflected back to the prism thereby continuing along the optical path and thus is subsequently directed to Surface 4. Therefore, light with wavelength <480 nm can be detected at the exit of Surface 3.

(e) Surface 4, having one or more layers of an optical coating(s), possess a long-pass filtering property such that light above 655 nm can pass through and exit the prism, whilst light below 655 nm is reflected back to the prism thereby continuing along the optical path and thus is subsequently directed to Surface 5. Therefore, light with wavelength from 655 nm to 735 nm can be detected at the exit of Surface 4.

(f) Surface 5, having one or more layers of an optical coating(s), possess a short-pass filtering property such that light below 502 nm can pass through and exit the prism, whilst light above 502 nm is reflected back to the prism thereby continuing along the optical path and thus is subsequently directed to Surface 6. Therefore, light with wavelength from 480 nm to 502 nm can be detected at the exit of Surface 5.

(g) Surface 6, having one or more layers of an optical coating(s), possess a long-pass filtering property such that light above 595 nm can pass through and exit the prism, whilst light below 595 nm is reflected back to the prism thereby continuing along the optical path and thus is subsequently directed to Surface 7. Therefore, light with wavelength from 595 nm to 655 nm can be detected at the exit of Surface 6.

(h) Surface 7, having one or more layers of an optical coating(s), possess a short-pass filtering property such that light below 556 nm can pass through and exit the prism, whilst light above 556 nm is reflected back to the prism thereby continuing along the optical path and thus is subsequently directed to Surface 8. Therefore, light with wavelength from 502 nm to 556 nm can be detected at the exit of Surface 7.

(i) There is no filtration coating on Surface 8. Therefore, the last remaining wavelengths from 556 nm to 595 nm will exit from Surface 8 and can be detected. So far, light entering the prism is spilt into component wavelengths of >735 nm (Surface 2), 655-735 nm (Surface 4), 595-655 nm (Surface 6), 556-595 nm (Surface 8), 502-556 nm (Surface 7), 480-502 nm (Surface 5), and <480 nm (Surface 3).

Figure 2E:
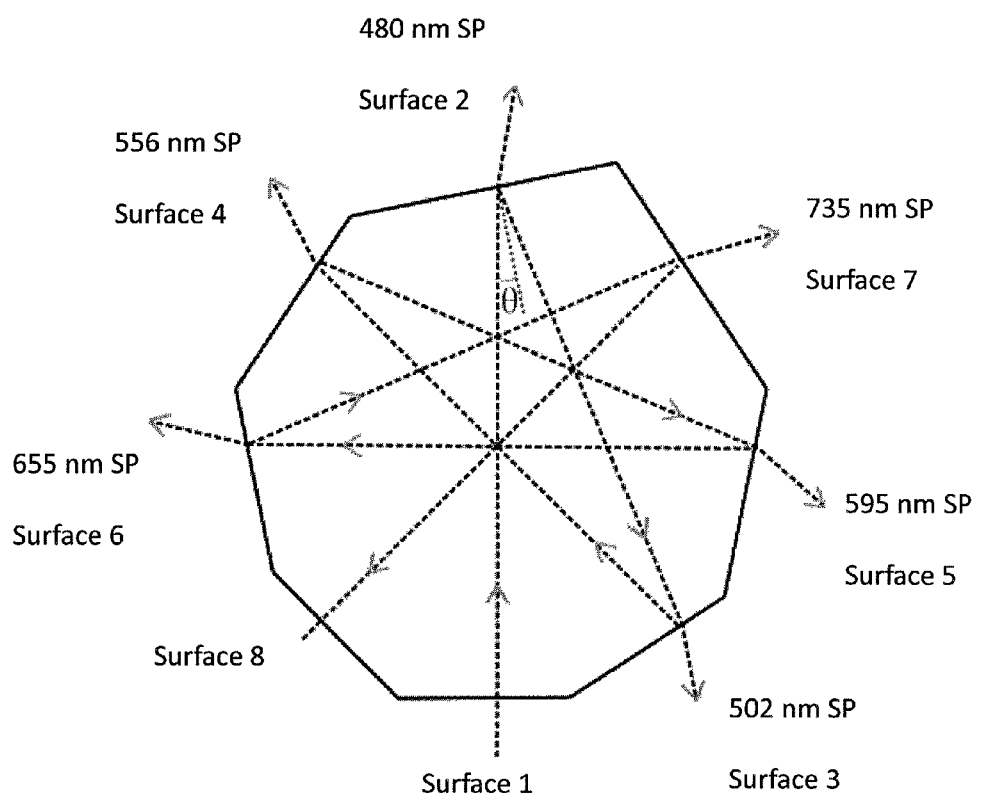
FIG. 2E shows an exemplary method of using a multiple-faced prism configured to split light into components with following wavelength ranges: <480 nm (Surface 2); 480-502 nm (Surface 3); 502-566 nm (Surface 4); 556-595 nm (Surface 5); 595-655 nm (Surface 6); 655-735 nm (Surface 7); >735 nm (Surface 8). The angle of refraction as the light exits the prism and enters the free space (i.e. air) at different surfaces can be determined using Snell's Law and the angle of incidence of the light at each surface.

Another example of a prism in depicted in FIG. 2E in which short-pass filters are arranged at different Surfaces of the prism and light splitting is achieved as follows:

(a) A collimated light beam is directed to an entry surface, labeled as Surface 1, through optical fiber or other optical coupling means.

(b) An anti-reflective coating on Surface 1 encourages the light to enter the prism at an angle of incidence of zero degree, and is first directed along an optical path towards a first filtering surface or an optical-filter surface referred to as Surface 2.

(c) Surface 2, having one or more layers of an optical coating, possess a short-pass filter property permitting light below 480 nm to pass through and exit the prism, whilst light above 480 nm is reflected inward to the prism thereby continuing along the optical path, which subsequently directs the remaining spectrum to a second coated surface, labeled as Surface 3. In the exemplary prism shown in FIG. 2E, the angle of incidence at Surface 2 for the light is 10 deg whilst the angle of refraction at Surface 2 or the angle in which light <480 nm exits the prism and enters the air is 15.36 deg. The angle of refraction is calculated based on Snell's law and using refractive index of 1.52532@450 nm for N-BK7 glass material, where refractive index information is from http://refractiveindex.info/?group=GLASSES&material=BK7 (accessible as of the filing date hereof), as an example. Therefore, light with wavelength <480 nm can be detected at the exit of Surface 2.

(d) Surface 3, having one or more layers of an optical coating(s), possess a short-pass filtering property such that light below 502 nm can pass through and exit the prism, whilst light above 502 nm is reflected back to the prism thereby continuing along the optical path and thus is subsequently directed to Surface 4. Therefore, light with wavelength from 480 nm to 502 nm can be detected at the exit of Surface 3.

(e) Surface 4, having one or more layers of an optical coating(s), possess a short-pass filtering property such that light below 556 nm can pass through and exit the prism, whilst light above 556 nm is reflected back to the prism thereby continuing along the optical path and thus is subsequently directed to Surface 5. Therefore, light with wavelength from 502 nm to 556 nm can be detected at the exit of Surface 4.

(f) Surface 5, having one or more layers of an optical coating(s), possess a short-pass filtering property such that light below 595 nm can pass through and exit the prism, whilst light above 595 nm is reflected back to the prism thereby continuing along the optical path and thus is subsequently directed to Surface 6. Therefore, light with wavelength from 556 nm to 595 nm can be detected at the exit of Surface 5.

(g) Surface 6, having one or more layers of an optical coating(s), possess a short-pass filtering property such that light below 655 nm can pass through and exit the prism, whilst light above 655 nm is reflected back to the prism thereby continuing along the optical path and thus is subsequently directed to Surface 7. Therefore, light with wavelength from 595 nm to 655 nm can be detected at the exit of Surface 6.

(h) Surface 7, having one or more layers of an optical coating(s), possess a short-pass filtering property such that light below 735 nm can pass through and exit the prism, whilst light above 735 nm is reflected back to the prism thereby continuing along the optical path and thus is subsequently directed to Surface 8. Therefore, light with wavelength from 655 nm to 735 nm can be detected at the exit of Surface 7.

(i) There is no filtration coating on Surface 8. Therefore, the remaining wavelengths above 735 nm will exit from Surface 8 and can be detected. So far, light entering the prism is spilt into component wavelengths of <480 nm (Surface 2), 480-502 nm (Surface 3), 502-556 nm (Surface 4), 556-595 nm (Surface 5), 595-655 nm (Surface 6), 655-735 nm (Surface 7), and >735 nm (Surface 8).

It is important to note that in above descriptions of short-pass, or band-pass or long-pass filtering properties in FIGS. 2A, 2C, 2D and 2E, we have used ideal filters for illustration and discussion. For example, for a short-pass filtering Surface 2 in FIG. 2E, it is indicated that the filtering Surface 2 would permit light below 480 nm to pass through and exit the prism, whilst light above 480 nm is reflected inward to the prism. For a practical short pass filter having a cutoff wavelength of 480 nm, the transmission efficiency through the filter Surface 2 may be 90% or higher for wavelength below 475 nm, and may gradually decrease with increasing wavelength to ~50% at 480 nm and to a few percent or even lower at wavelengths above 485 nm. In this case, the transmission efficiency has a transition range of 480±5 nm. Correspondingly, the reflection efficiency at the filter Surface 2 may be 98% or above for wavelength above 485 nm, and may gradually decrease with decreasing wavelengths to ~50% at 480 nm and to less than 10% or even lower at wavelengths below 475 nm. Thus, the practical short-pass filters would have a transition wavelength range over which the filtering surface property changes from transmission at a higher efficiency to reflection at a higher efficiency, as the wavelength increases. The above mentioned transmission efficiency numbers, reflection efficiency numbers as well as transition wavelength ranges are for illustration purposes.

For Surfaces 2 though 7 in FIGS. 2A, 2C, 2D and 2E, a preferred requirement for the long pass filters on each of these filters is that the transmission is greater than 90% for wavelengths above the transition range whilst reflection greater than 98% for wavelength ranges below the transition range. In a further exemplary embodiment, there is an anti-reflective coating on Surface 1, with an AR ratio less than 1.5% for a wavelength range of 400-820 nm. There are a number of other parameters related to the coatings on Surfaces 2 though 7 such as long-pass or short-pass wavelength tolerance, short-pass or long-pass transmission slope, etc. Those who are skilled in the art can readily determine appropriate requirements for these coatings.

In another approach or method of use, when the prism is of appropriate thickness, two light beams could enter the same surface (such as Surface 1 or Surface 8) at different vertical locations and thus each spectrum or traveling light beam could be split into components having different wavelengths or wavelength ranges. For example, a prism thickness that is relatively large (e.g. 30 mm tall in a vertical direction) could permit two light beams to enter Surface 1 at locations separated by 15 mm along the vertical direction. Accordingly, at each surface the light components could be separated from each of the two light beams would exit the prism at different locations along the vertical directions of each filter and could be detected/measured separately by two optical sensors.

In yet another method of use, the prism of present invention comprises two entry surfaces and two exit surfaces, wherein the first entry surface and the second exit surface are the same surface and the second entry surface and the first exit surface are the same surface. In such a configuration, the first two emission spectra may enter the prism via the first entry surface at two separate locations for guidance to a first filter surface. After separation according to predetermined wavelengths or wavelength ranges defined by the filter surfaces the last remaining wavelengths pass outward from the first exit surface at two separate locations as well. At the same time, the prism receives a second two emission spectra at the second entry surface for entry into the prism at two separate locations and guides the second spectra towards another of the filter surfaces. After separation according to predetermined wavelengths or wavelength ranges defined by the filter surfaces the last remaining wavelengths pass outward from the second exit surface at two separate locations as well. The first two emission spectra enter the first entry surface at two separate locations different from the two exit locations of the second two emission spectra at the first entry surface/the second exit surface. Likewise, the second two emission spectra enter the second entry surface at two separate locations different from the two exit locations of the first two emission spectra at the second entry surface/the first exit surface. Thus, at each entry surface/exit surface, there are two entering light beams and two exiting light beams, located at four different locations, thereby resulting in eight distinct locations at two entry/exit surfaces on the prism. As such, four emission spectra can be simultaneously or near simultaneously split into corresponding wavelength components.

In view of the above, it should become evident that a multiple-faced prism as depicted in FIG. 2 is capable of splitting a light spectrum into a plurality of components, each having different wavelengths or wavelength ranges, which achieves the same functionality as a set of optical components, such as those depicted in FIG. 1. The skilled artisan will appreciate that in use, it is easier or simpler to perform the optical alignment or adjustment involving such a prism compared to systems involving a number of inter-dependent optical components. Further, the prism occupies a relatively smaller space, which results in a more compact and small footprint instrument to be designed and developed.

Figure 3:
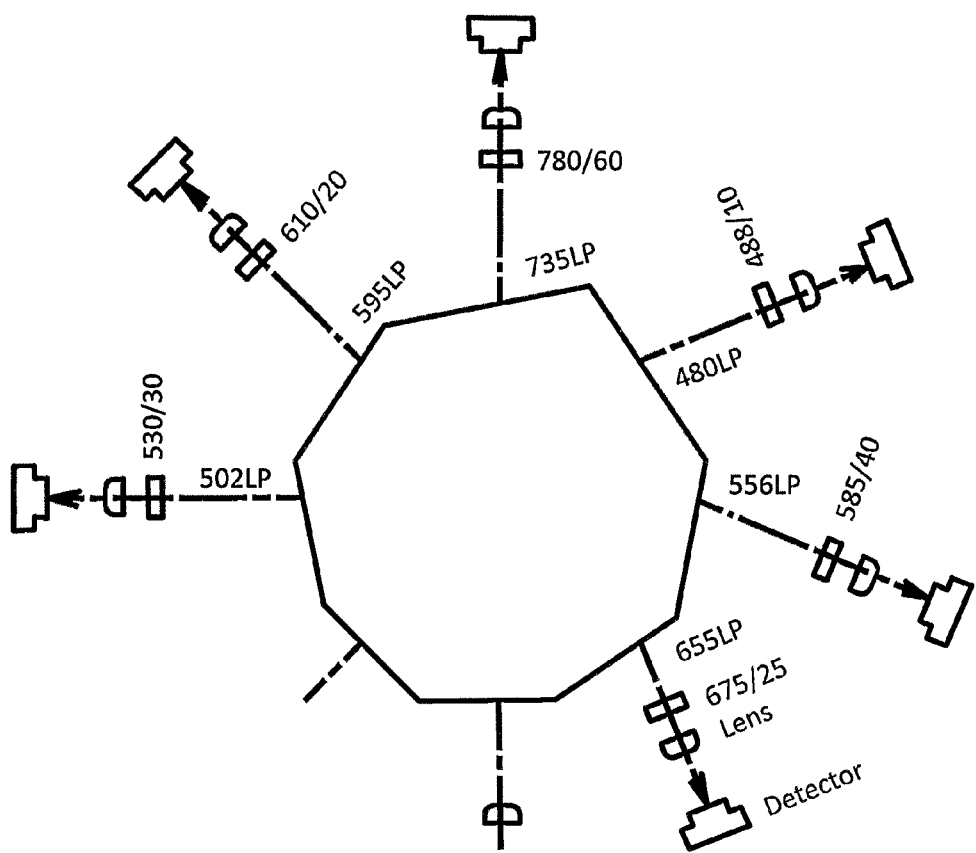
FIG. 3 shows an overview schematic of an optical system or apparatus utilizing the multiple-faced prism of FIG. 2A for splitting a plurality of different light wavelength components from an initial light spectrum or emission spectrum, passing the wavelength components through an additional bandpass filter, and directing the filtered wavelength components to corresponding detectors.

Turning to FIG. 3 an example of optical system or overview of an apparatus, which employs the optical prism of FIG. 2 is provided. Operationally, as the light separated into different wavelength ranges exits the prism, it passes through appropriate band-pass filters and is focused onto an optical detector such as PMT. Exemplary band-pass filters for Surface 2 through 7 are 780/60 nm, 675/25 nm, 610/20 nm, 585/40 nm, 530/30 nm, 488/10 nm, respectively.

Figure 4:
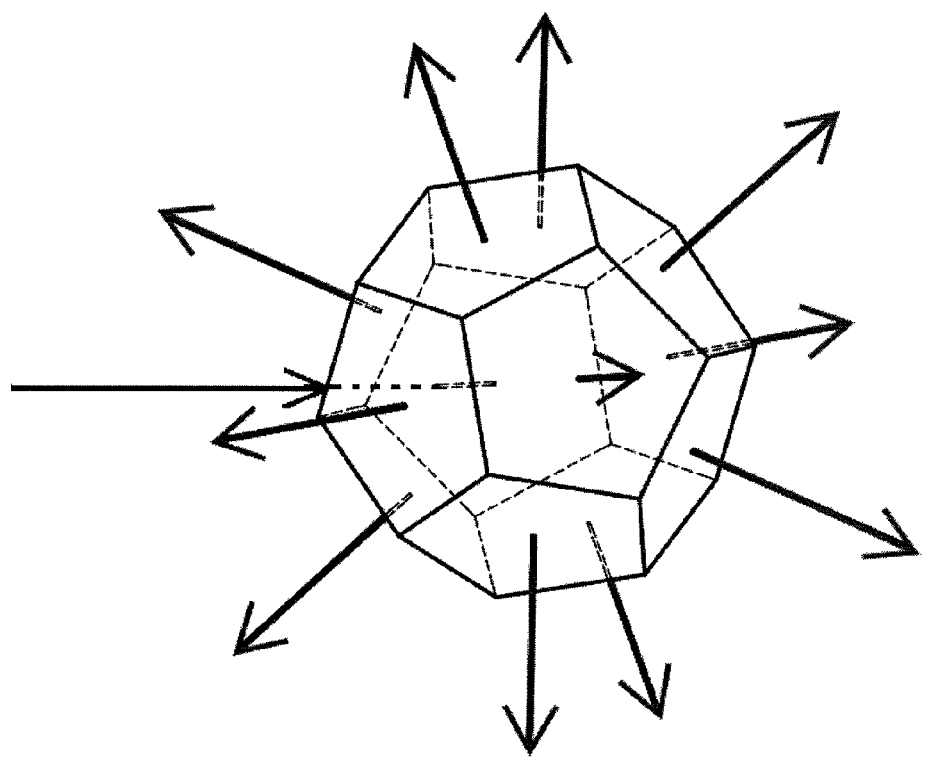
FIG. 4 shows a 3-dimensional, multi-faced prism capable of splitting light into a plurality of components with varying wavelength ranges.

FIG. 4 shows an example of a 3-dimensional prism, having different structures from those shown in FIG. 2. Each surface (Surface 1 through 8) in FIG. 2 is normal to a common plane (e.g. horizontal plane), yet there is no such requirement for the surfaces of the 3-D prism in FIG. 4. Similar to those in FIG. 2, each filtering surface has one or more optical coating layers to possess predetermined filtering properties. Thus, as a light spectrum or emission spectrum travels and is directed along an optical path inside the prism, at each surface, light of predetermined wavelength or predetermined wavelength range is permitted to exit the prism whilst remaining wavelengths are reflected back into the prism to continue along an optical path. Thus, the coatings on these surfaces should also follow certain predetermined configurations with appropriate cutoff wavelengths, following the same rule as described above. For example, such coatings are either from long to short (for long-pass type configuration) or from short to long (for short-pass type configuration) for each coated surface through which the light passes sequentially so that the longer wavelength light (for long-pass type) or shorter wavelength light (for short-pass type) would exit the prism first followed by those with different predetermined wavelengths.

EXAMPLE 1

Figure 5A:
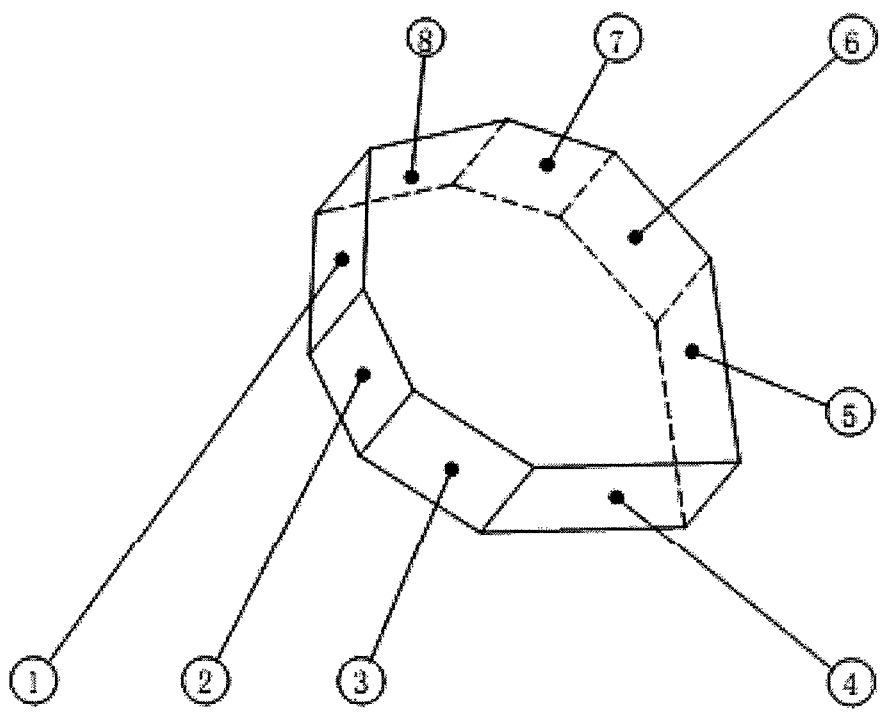
FIG. 5A shows a 3-dimensional view of an eight-faced prism capable of splitting light into a plurality of components with varying wavelength ranges. The prism has the same geometrical dimensions as that shown in FIG. 2B.

N-BK7 glass was shaped to form an eight-faced prism, a 3-dimensional representation of which is shown in FIG. 5A. The eight surfaces were shaped to the same geometrical dimensions as that shown in FIG. 2B. This prism was produced to show the light-splitting functionality of light-splitting prism of the present invention. To simplify the production process and to demonstrate the operational principle of the light-splitting prism, three surfaces were coated with optical coatings having short-pass or band-pass properties. The design requirements for Surface 2, 5 and 6 are provided in TABLE 1:

TABLE 1

| Surface Number | Transmission >90% | Transmission = 50% | Reflection >98% |
| --- | --- | --- | --- |
| Surface #5 | 480-495 nm | 503-513 nm | 514-820 nm |
| Surface #2 | 500-550 nm | 550-560 nm | 565-820 nm |
| Surface #6 | 550-620 nm | 635-645 nm | 660-820 nm |

Figure 5B:
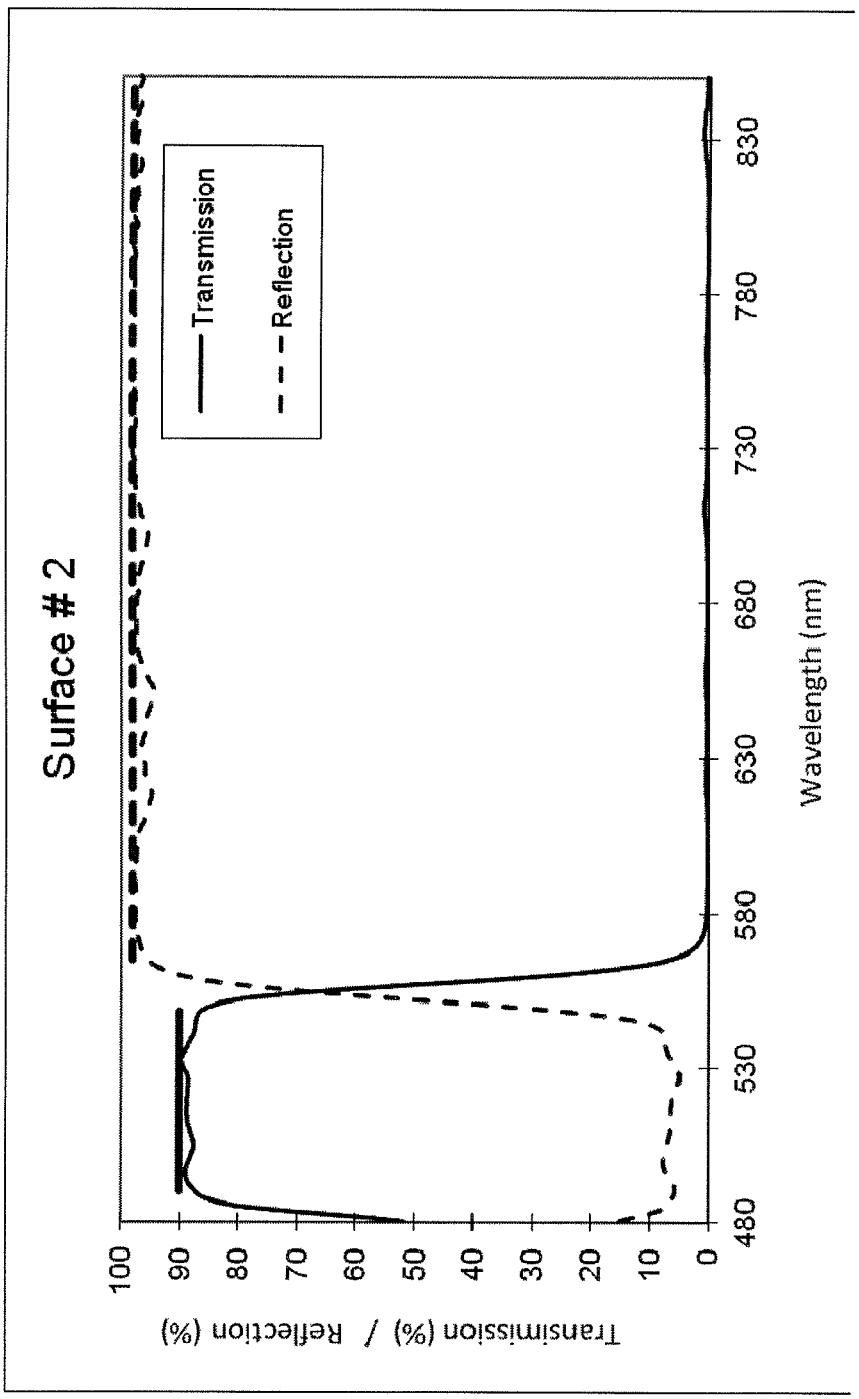
FIG. 5B shows the transmission and reflection spectra for Surfaces #2 of a prism in FIG. 5A.
Figure 5C:
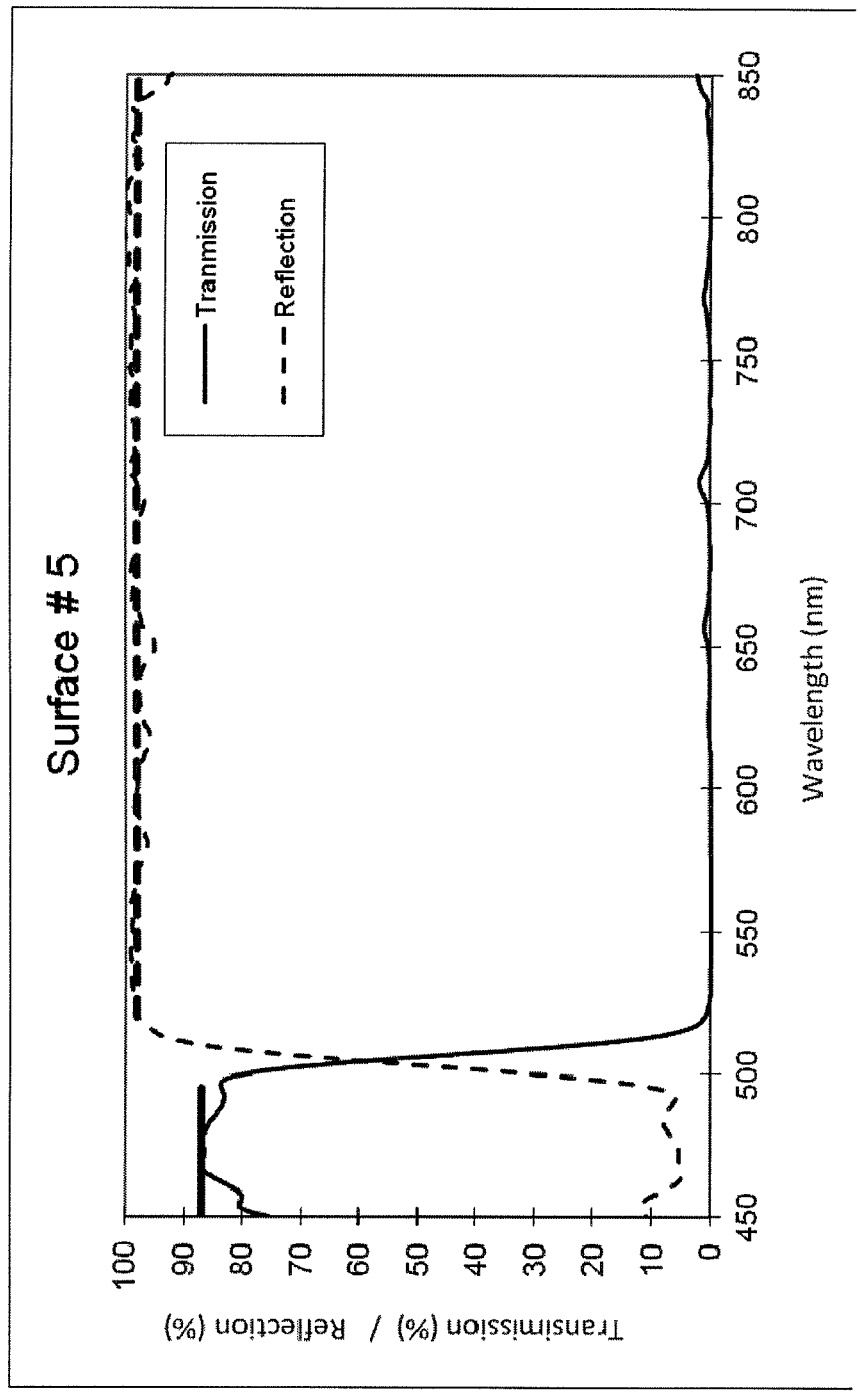
FIG. 5C shows the transmission and reflection spectra for Surface #5 of a prism in FIG. 5A.

FIGS. 5B and 5C show the transmission and reflection spectra, respectively, for Surface #2 and Surface #5 of the prism produced based on the design requirement in above table. Transmission of 50% occurred at ~557 nm and ~506 nm, for Surface #2 and #5, respectively.

The prism was tested with three lasers having wavelengths of 488 nm, 532 nm and 640 nm, respectively. Laser light was introduced to the Surface #1 of the prism. Light powers before entering Surface 1 and after different surfaces were measured and recorded as provided in TABLE 2:

TABLE 2

| Power (mW) | Before Surface 1 | After Surface 5 | After Surface 2 | After Surface 6 | After Surface 3 | After Surface 7 | After Surface 4 | After Surface 8 |
| --- | --- | --- | --- | --- | --- | --- | --- | --- |
| 488 nm | 18.9 | 17.3 | 1.6 | 0 | 0 | 0 | 0 | 0 |
| 532 nm | 5-6 | 0 | 5-6 | 0 | 0 | 0 | 0 | 0 |
| 640 nm | 49.5 | 1.2 | 2.3 | 20.9 | 18.2 | 2.3 | 1.4 | 0 |

The above measured data is in agreement with expected light-splitting performance of the Prism. For example, Surface 5 was designed with a >90% transmission for 480-495 nm range, thus 91.5% of 488 nm laser light entering the Surface 1 of the prism exited the prism at Surface 5. For 532 nm laser, nearly-all laser light at this wavelength exited the prism at Surface 2, negligible power levels could be detected at other surfaces of the prism. On the other hand, as Surface 6 was designed having 50% transmission at a wavelength between 635 and 645 nm, about 42% of 640 nm laser light exited the prism at Surface 6, whilst the majority of the remainder light exited the prism at Surface 3.

What is claimed is:

1. A prism, comprising a substrate faceted to provide a plurality of flat surfaces, wherein two of the plurality of surfaces are entry surfaces that direct entry of light into the prism towards opposite optical paths and at least a different two of the plurality of surfaces comprise a filter coating to form at least two filter surfaces, wherein each entry surface directs light towards a different first filter surface, further wherein each filter surface selectively permits passage of a predetermined wavelength or wavelength range and reflects remaining wavelengths along an optical path towards another filter surface for selective passage of another wavelength or wavelength range or towards an exit surface for exiting last remaining wavelengths, wherein an angle of incidence of each of the plurality of surfaces along the optical path is equal or nearly equal.

2. The prism according to claim 1, wherein at least one filter is selected from the group consisting of a long-pass filter to selectively permit passage of wavelengths equal or greater than the predetermined wavelength, a short-pass filter to selectively permit passage of wavelengths equal or less than the predetermined wavelength, and a band-pass filter to selectively permit passage of wavelengths equal to the predetermined wavelength or wavelength range.

3. The prism according to claim 2, comprising a plurality of long-pass filters in a descending series to selectively permit passage of decreasing wavelengths along the series.

4. The prism according to claim 2, comprising a plurality of short-pass filters in an ascending series to selectively permit passage of increasing wavelengths along the series.

5. The prism according to claim 2, comprising a plurality of band-pass filters to selectively permit passage of different wavelengths along the series.

6. The prism according to claim 2, comprising a plurality of filters with mixed long-pass and short-pass filters to selectively permit passage of different wavelengths.

7. The prism according to claim 1, wherein a first entry surface receives a first emission spectrum for a series of wavelength splitting steps followed by passage of last remaining wavelengths outward from a first exit surface for this first emission spectrum and a second entry surface receives a second emission spectrum for a series of wavelength splitting steps followed by passage of last remaining wavelengths outward from a second exit surface for this second emission spectrum, wherein the first entry surface and the second exit surface are the same surface and the second entry surface and the first exit surface are the same surface.

8. The prism according to claim 1, wherein one of the entry surfaces is configured to receive a first two emission spectra into the prism and for directing the first two emission spectra towards a same first filter surface, further wherein the first two emission spectra enter into the prism at two separate entry locations on the entry surface.

9. The prism according to claim 8, further wherein:
a second of the entry surfaces has two separate entry locations for receiving and directing a second two emission spectra into the prism and towards another of the at least two filter surfaces;
a first exit surface having two separate exit locations to permit passage of last remaining wavelengths from the first two emission spectra; and
a second exit surface having two separate exit locations to permit passage of last remaining wavelengths from the second two emission spectra;
wherein the entry surface for receiving the first two emission spectra and the second exit surface to permit passage of the last remaining wavelengths from the second two emission spectra are the same, and the first exit surface to permit passage of last remaining wavelengths from the first two emission spectra and the second entry surface for receiving the second two emission spectra are the same;
wherein each of the separate locations are different thereby forming eight distinct spatial locations and permitting simultaneous splitting of four emission spectra.

10. The prism according to claim 1, wherein the predetermined wavelength or wavelength range is selected from the group consisting of 735 nm or greater, 655-735 nm, 595-655 nm, 556-595 nm, 502-556 nm, 480-502 nm and 480 nm or less.

11. The prism according to claim 1, wherein the coating is selected from the group consisting of a long-pass filter coating, a short-pass filter coating, and a band-pass filter coating.

12. An apparatus for selective measurement of a plurality of wavelengths from an emission spectrum, comprising:
a) an excitation source comprising a light source focused on a sample region for housing a sample;
b) the prism according to claim 1 in alignment to receive an emission spectrum from the sample region; and
c) at least two detectors, each in optical alignment with at least two of the filters to measure passage of the predetermined wavelength or wavelength range.

13. The apparatus according to claim 12, wherein the apparatus is flow cytometry apparatus optionally comprising a cell sorting capability.

14. The apparatus according to claim 12, wherein the apparatus is a fluorescent microscope.

15. The apparatus according to claim 12, further comprising a lens following each filter surface to focus the passed wavelength or wavelength range to the detector.

16. The apparatus according to claim 12, further comprising a lens positioned between the sample region and the prism.

17. A method for selectively measuring a plurality of wavelengths from an emission spectrum, comprising:
a) providing the apparatus according to claim 12;
b) positioning a sample in the sample region;
c) activating the light source to induce a spectrum emission from the sample;
d) measuring the predetermined wavelengths or wavelength ranges passed from each of the filters.

18. The method according to claim 17, wherein the sample is a biological sample.

* * * * *